United States Patent [19]

Jacobaeus et al.

[11] 3,883,686

[45] May 13, 1975

[54] METHOD TO REDUCE THE EFFECT OF A LOSS OF INFORMATION DURING TRANSMISSION COMPRESSED BAND WIDTH AND DEVICE FOR CARRYING OUT THE METHOD

[75] Inventors: Anton Christian Jacobaeus; Lars Ake Wern, both of Stockholm, Sweden

[73] Assignee: Telefonaktiebolaget L M Ericsson, Stockholm, Sweden

[22] Filed: Sept. 20, 1973

[21] Appl. No.: 399,400

[30] Foreign Application Priority Data

Oct. 12, 1972 Sweden ............................ 13182/72

[52] U.S. Cl. ................ 178/6.8; 178/6; 178/DIG. 3

[51] Int. Cl. ........................................ H04n 1/38

[58] Field of Search .................... 178/DIG. 3, 6, 6.8

[56] References Cited

UNITED STATES PATENTS

| | | | |
|---|---|---|---|
| 2,850,574 | 9/1958 | Kretzmer | 178/DIG. 3 |
| 3,666,888 | 5/1972 | Sekimoto | 178/DIG. 3 |
| 3,670,096 | 6/1972 | Candy | 178/DIG. 3 |
| 3,715,489 | 2/1973 | Brown | 178/DIG. 3 |
| 3,755,624 | 8/1973 | Sekimoto | 178/DIG. 3 |

*Primary Examiner*—Howard W. Britton
*Assistant Examiner*—Michael A. Masinick
*Attorney, Agent, or Firm*—Hane, Baxley & Spiecens

[57] ABSTRACT

The invention relates to a method and a device for reducing the effect of a loss of information during transmission at compressed band width, particularly during transmission at compressed band width of a PCM-signal. Each of the serially generated PCM-words indicates the light intensity in picture elements that are serially scanned in a TV-frame, the number of transmitted PCM-words in each TV-frame being less than the number of generated PCM-words. According to the invention the effect of the loss of picture information is reduced in such a manner that when band width comprsssion is made TV-line by TV-line the loss will alternately occur on the left and right edges of the TV-lines on the screen viewed downwards in consecutive order and when band width compression is made TV-field by TV-field the loss will alternately occur on the upper and lower edges of the screen, the loss of picture information only appearing as a lesser degree of resolution along the respective edges of the screen.

10 Claims, 7 Drawing Figures

METHOD TO REDUCE THE EFFECT OF A LOSS OF INFORMATION DURING TRANSMISSION COMPRESSED BAND WIDTH AND DEVICE FOR CARRYING OUT THE METHOD

The invention relates to a method to reduce the effect of a loss of information during transmission at compressed band width, particularly during transmission at compressed band width of a PCM-signal in wherein serially generated PCM-words indicate the light intensity in picture elements sequentially scanned in a TV-frame, the number of transmitted PCM-words in each TV-frame being less than the number of generated PCM-words. Furthermore, the invention relates to a device for carrying out the method.

A known method for transmission at compressed band width of a PCM-signal, in which PCM-words serially generated indicate the light intensity in picture elements sequentially scanned on a TV-line, utilizes the fact that the light intensity changes relatively seldom along the TV-line in such manner that upon the appearance of a number of equal PCM-words serially generated their light intensity information is transmitted without repetition and accompanied by information about their number. The method is described in the U.S. Pat. No. 2,963,551. If the band width compression takes place for example TV-line by TV-line, the number of transmitted PCM-words are for each TV-line less than the number of generated PCM-words. Upon transmission of TV-lines that contain a great amount of information it can thus occur that the information during the latter scanned part of respective TV-lines is not transmitted so that a part of the picture becomes lost along the right edge of the screen if conventional right hand directed line sweep on the screen of the TV-receiver is used. Upon a band width compression TV-field by TV-field it can occur in the corresponding way that information is not transmitted during the latter scanned part of the TV-fields so that a part of the picture along the lower edge of the screen becomes lost if conventional downwards directed field sweep on the screen on the TV-receiver is used.

According to the invention the effect of such loss of picture information is reduced in such manner that when band width compression is made TV-line by TV-line the loss will alternately occur on the left and right edges of the TV-lines on the screen viewed downwards in consecutive order and when band width compression is made TV-field by TV-field the loss will alternately occur on the upper and lower edges of the screen. Thus, the loss of picture information only appears as a lower degree of resolution along the respective edges of the screen.

The invention is defined in the appended claims and will be described more in detail by means of an embodiment by making reference to the accompanying drawing where;

Figure 1:
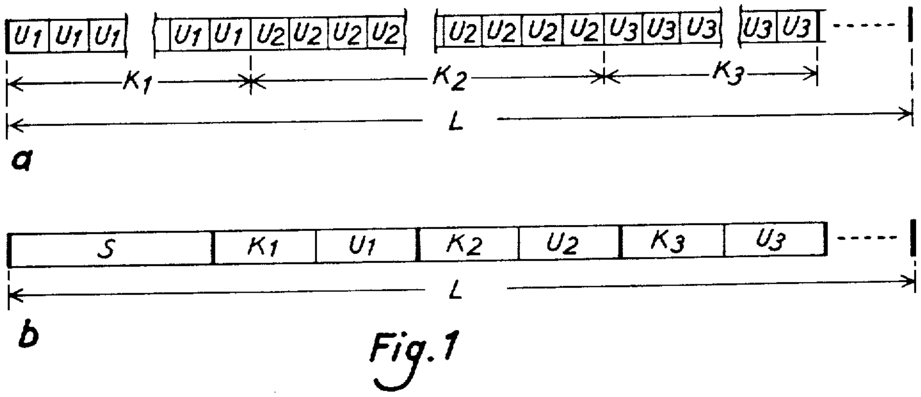
FIG. 1 is a timing diagram showing compressed band width transmission of a PCM-coded TV-signal.

On line *a* in FIG. 1 a time sequence is shown for a PCM-signal which has been obtained by coding of a TV-signal wherein groups of picture elements that are sequentially scanned and have equal light intensity are assumed to have been coded into K1 PCM-words U1, K2 PCM-words U2, K3 PCM-words U3, and so on. According to the example the PCM-coding uses a word format containing four bits and a frame with a time length L equal to the line sweep period at the TV-signal.

On line *b* in FIG. 1 the PCM-signal according to line *a* is shown recoded in such manner that PCM-words have been formed in a word format containing eight bits, which PCM-words contain the signal information of the groups that are shown on line a and contain PCM-word U1, PCM-word U2, PCM-word U3, and so on. The PCM-words contain also information about the number of PCM-words in the respective groups in the form of the numbers K1, K2, K3 and so on expressed in binary form by four bits. A synchronization word S is inserted at the beginning of every frame.

It is assumed that the TV-signal has a resolution of about 400 picture elements per line sweep and that normally occurring picture information contains maximally 50 non-redundant picture elements per line sweep. According to the example the eight bits PCM-coding according to line *b* in FIG. 1 can employ a four times lower bit timing frequency than the four bits PCM-coding according to line *a*.

Figure 2:
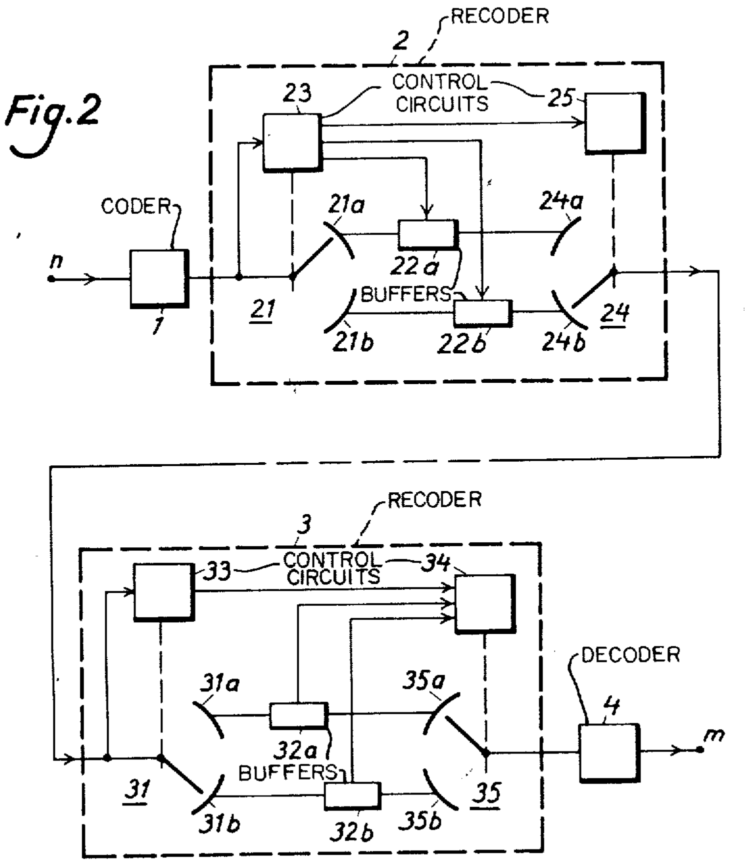
FIG. 2 is a block diagram of a PCM-system consisting of a transmission terminal and a receiving terminal accomplishing a transmission of information at compressed band width according to FIG. 1.

FIG. 2 shows a block diagram of a PCM-system consisting of a transmission terminal and a receiving terminal to accomplish a transmission of information according to FIG. 1. At the transmission terminal of the PCM-system a PCM-coder 1 is on an input n fed with an analog video signal from a not shown TV-equipment which can be of a conventional type with 625 line sweep per picture and 25 pictures per second for example. The PCM-coder 1 converts the analog video signal to a PCM-signal according to line a in FIG. 1 in such manner that the picture elements in the video signal will be equivalent to PCM-words having binary values which are equivalent to respective light intensities of the picture elements. The PCM-words according to the example have a word format of four bits to make it possible to transmit information on 16 different light intensity values. According to the principle of the invention the PCM-signal from the PCM-coder is recoded in a recoding device 2 provided with a buffer to transmit to the transmission medium a PCM-signal according to line *b* in FIG. 1 and having a word format of eight bits.

At the receiver terminal of the PCM-system the transmitted PCM-signal is once again recoded in a recoding device 3 provided with a buffer so that PCM-words are obtained in the original word format of four bits, which PCM-words are fed into a PCM-decoder 4 to produce at output m an analog signal corresponding to the original analog video signal.

The recording device 2 at the transmission terminal comprises a selector 21 which is divided into two sections 21*a* and 21*b* which work alternately under subsequent frames of the output signal from the PCM-coder 1 and according to the example are connected to 50 shift registers of eight bit positions each in a buffer 22*a* and 22*b* respectively. The stepping forward of the selector 21 is obtained through pulses which are generated by a control circuit 23 that is fed with the output signal of the PCM-coder 1. The circuit 23 investigates the signal information in every PCM-word to determine whether it corresponds to the signal information in the preceeding PCM-word or not and to count the number of subsequent PCM-words that have the same signal information. With thė help of the control circuit 23, eight bits PCM-words are registered in the shift registers of the buffers 22*a* and 22*b* which for every group of subsequent PCM-words with the same signal information from the PCM-coder 1, store this signal information and furthermore stores a binary number with four bits indicating the number of PCM-words in the group; and which, for every PCM-word from the PCM-coder 1 occurring signal information only once, stores such signal information and also a binary number which indicates that this signal information occurs during only one PCM-word.

The eight bits PCM-words in the shift register of the buffers 22*a* and 22*b* are fed out to the transmission medium over a selector 24 which is divided into two sections 24*a* and 24*b* and which determines from which shift register read-out shall be made. The stepping forward of the selector 24 takes place through pulses generated by a second control circuit 25. Control circuit 25 is coordinated with the control circuit 23 in such manner that, for example, when registering takes place in the buffer 22*a*, read-out takes place from the buffer 22*b* and vice-versa. The control circuit 25 controls read-out at a considerably slower rate than used for registering. According to the example the bit timing frequency is four times less for read-out than for registering. The control circuit 25 inserts, furthermore, a synchronization word at the beginning of every frame.

The recording device 3 at the receiver terminal contains a selector 31 which is divided into two sections 31a and 31b which according to the example distributes the transmitted PCM-words over 50 shift registers of eight bit positions each in buffer 32*a* and buffer 32*b* respectively. The stepping forward of the selector 31 is synchronous with the stepping forward of the selector 24 at the transmitter terminal and takes place through pulses which are generated by a third control circuit 33 by regenerating the incoming bit timing frequency of the PCM-words and by detecting the transmitted synchronization word at the beginning of every frame. The four bit binary number which is inserted into the received PCM-word by the control circuit 23 at the transmitter terminal is read out to a fourth control circuit 34 which supplies the signal information of the PCM-words to a number of subsequent four bits PCM-words as indicated by the four bit binary number to the PCM-decoder 4 via a selector 35 which is divided into two sections 35*a* and 35*b* and determines from which shift register in the buffers 32*a* and 32*b* read-out shall take place.

The stepping forward of the selector 35 takes place in response to pulses generated by the control circuit 34 which is coordinated with the control circuit 33 in such manner that when registering takes place in the buffer 32*a* for example, read-out takes place from the buffer 32*b* vice-versa. The control circuit 34 cause read-out to occur at a considerably faster rate than registering. According to the example the bit timing frequency is four times larger at read-out than at registering.

In the description of the transmitting system according to FIG. 2 it has been assumed that 400 picture elements are PCM-coded per line sweep and that at most 50 non-redundant picture elements can be transmitted per line sweep. This means that if a TV-line consists of more than 50 non-redundant picture elements, the last scanned picture elements on the right edge of the TV-line, during conventional right hand directed line sweep, will not be reproduced at the receiver terminal. Therefore, during transmission of TV-pictures with a great amount of information it can happen that part of the picture along the right edge of the screen becomes lost.

According to the invention the influence of the above-mentioned loss of picture information is reduced in such manner that the loss will occur on the right edge of odd TV-lines and on the left edge of even TV-lines. Thus the loss of picture information becoming observable only through a lower degree of resolution during the right and left edges of the screen. The invention can also be applicable on such TV-transmission systems in which a band width compression is to be accomplished not line by line as described in connection with FIG. 1 and FIG. 2 but instead field by field. In such case the picture information then becomes lost along the lower edge of the screen during conventional downwards directed field sweep. However, the influence of the loss is reduced in such manner that it will occur on the lower edge of the screen during odd TV-fields and on the upper edge of the screen during even TV-fields.

Figure 3:
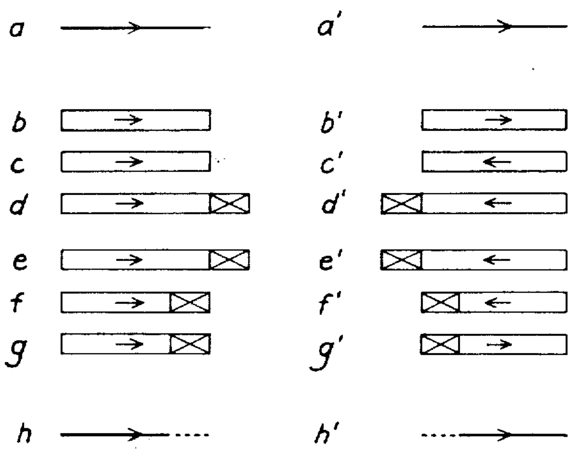
FIG. 3 is a diagram which shows a signal sequence according to the principle of the invention to reduce the influence of a loss of information upon transmission of information at compressed band width according to FIGS. 1 and 2.

FIG. 3 is a time diagram showing signal sequences according to the principle of the invention for reducing the influence of a loss of information during the compressed band width transmission according to FIGS. 1 and 2. The left half of FIG. 3 shows the sequence during transmission of odd TV-lines. Line *a* symbolizes a scanned TV-line at the transmission terminal of a transmission system and shows the time sequence in which the scanning of the picture elements on the TV-line takes place, line *b* shows the time sequence for the picture elements when they are being registered in a store means in the form of a PCM-word in a PCM-signal, and line *c* shows the time sequence for the picture elements when the PCM-signal is being read out from the store means. Line *d* symbolizes a band width compression of the PCM-signal, the marked area symbolizing a thereby-produced loss of a number of PCM-words. Line *e* symbolizes the band width compressed PCM-signal transmitted to the receiver terminal in the transmission system, line *f* symbolizes a band width expansion of the received PCM-signal, the marked area symbolizing the PCM-words which we lost lost during the transmission because of the band width compression, the time sequence for the picture elements being shown when the PCM-signal is registered in a store means. Line *g* shows the time sequence for the picture elements when the PCM-signal is read out from the store means, and line *h* symbolizes the reproduced TV-line at the receiver terminal of the transmission system and shows the time sequence for the picture elements during their reproduction. It is seen that the loss of PCM-words because of the band width compression during the transmission will become observable as a loss of picture elements on the right halfs of the odd TV-lines as it is indicated by a dash line portion of the TV-line on line *h*.

The right half of FIG. 3 shows transmission of even TV-lines. Line *a'* symbolizes, in correspondence to line a, a scanned TV-line and shows the time sequence in which the scanning of the picture elements on the TV-line takes place, line b' shows the time sequence for the picture elements when they are registered in a store means in form of PCM-words in a PCM-signal, and line *c'* shows the time sequence for the picture elements when the PCM-signal is read out from the store means. It should be noted that read-out takes place in inverted time sequence with respect to registering. Line *d'* symbolizes a band width compression of a PCM-signal, the marked area symbolizing a thereby, produced, loss of a number of PCM-words, line *e'* symbolizes the band width compressed PCM-signal transmitted to the receiver terminal in the transmission system, line *f'* symbolizes a band width expansion of the received PCM-signal, the marked area symbolizing the PCM-words which have become lost during transmission because of the band width compression, the time sequence for the picture elements being shown when the PCM-signal is registered in a store means, and line *g'* shows the time sequence for the picture elements during read-out of the PCM-signal from the store means, read-out taking place in inverted time sequence with respect to registering. Line *h'* symbolizes the reproduced TV-line at the receiver terminal of the transmission system and shows the time sequence for the picture elements during their reproduction. It is seen that the loss of PCM-words because of the band width compression during the transmission will become observable as a loss of picture elements on the left halfs of the even TV-lines as it is indicated by a dash line portion of the TV-line on line *h'*. Furthermore, it appears that during superposition of the odd and even TV-fields the consequence of a loss of picture information is not that part of the picture becomes lost along the edge portions of the screen, but only that the picture there will have a lower degree of resolution.

Figure 4:
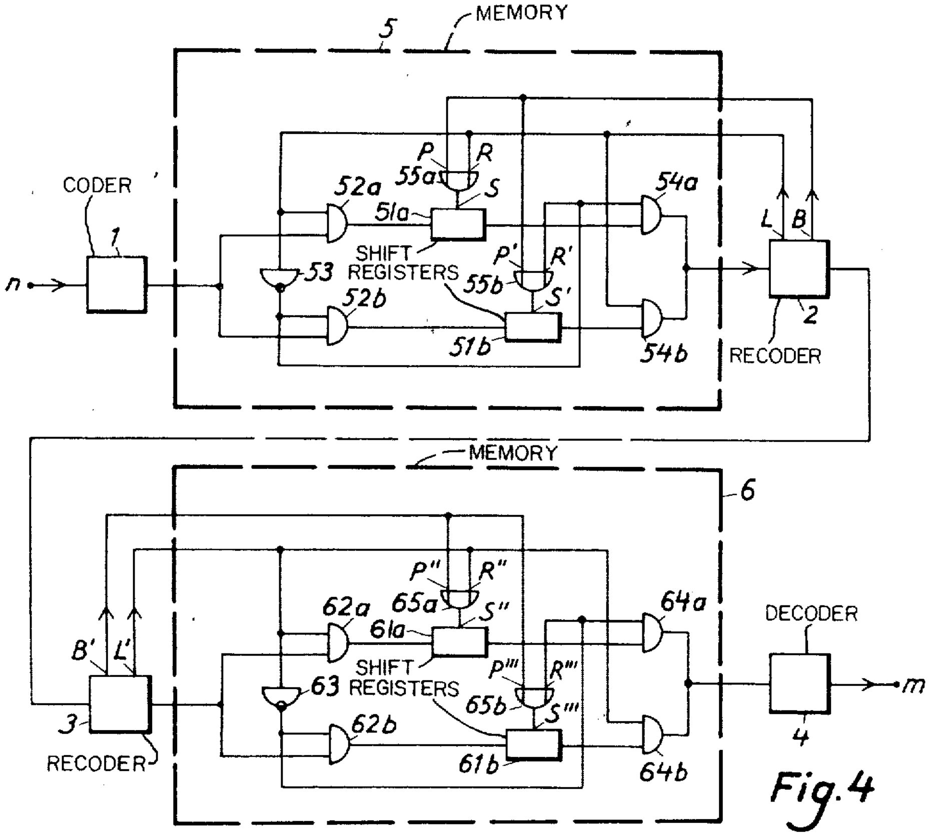
FIG. 4 shows the PCM-system in FIG. 2 completed with a device to accomplish a transmission of information according to the principle of the invention.

FIG. 4 shows the PCM-system according to FIG. 2 completed with a device to produce an information transmission according to the principle of the invention as illustrated in FIG. 3. The blocks 1, 2, 3 and 4 correspond to the blocks with the same labels as in FIG. 2. According to the invention a first store device or memory 5 is connected between the PCM-coder 1 and the recoding device 2 at the transmission terminal and a second store device or memory 6 is connected between the recoding device 3 and the PCM-decoder 4 at the receiver terminal. Furthermore, the recording devices 2 and 3 at the transmission and receiver terminal are provided with two outlets L and B and L' and B' respectively to transmit a line timing signal and a field timing signal to the store devices 5 and 6.

The purpose of the store device 5 is to store the PCM-words line by line before the recording of the PCM-signal in the recoding device 2 occurs to obtain a band width compressed transmission signal, and to feed them out in a maintained sequential order during odd lines, i.e. lines belonging to odd TV-fields, and in a reversed sequential order during even lines, i.e. lines belonging to even TV-fields. For this purpose the store device 5 comprises two shift registers 51*a* and 51*b* which during subsequent line periods are fed alternately with the PCM-signal over gate circuits 52*a* and 52*b* respectively in the form of AND-circuits, one input of which receives the PCM-signal from the PCM-coder 1 and another input of which receives the line timing signal from the output L of the recoding device 2 directly and over an inverting gate 53, respectively. The line timing signal from the output L is assumed to having a binary 1-level for every second line period and otherwise to have a binary 0-level.

Read-out from the shift registers 51*a* and 51*b* takes place over gate circuits 54*a* and 54*b* respectively in the form of AND-circuits, one input of which is connected to an output at the respective shift register and another input of which receives the line timing signal from the output L of the recoding device 2 via the inverting gate 53 and directly respectively. The shift registers 51*a* and 51*b* are provided with a control input S and S' respectively by means of which the shifting in the shift registers are controlled in such manner that a control signal with binary 1-level, a right shift direction while a control signal with a binary 0-level produces a left shift direction. The control signal is generated by two OR-circuits 55*a* and 55*b* with two inputs P and R and P' and R' respectively. From the output L a binary 1-signal is fed to the input R directly and to the input R' over the inverting gate 53 when registering occurs in the respective shift registers. From the output B of the recoding device 2 a binary 1-signal is fed to the inputs P and P' during odd TV-fields and a binary 0-signal is fed to the imputs P and P' during even TV-fields. From this it appears that during odd TV-fields both registering and read-out take place in right shift direction while during even TV-fields registering takes place in right shift direction while read-out takes place in left shift direction, i.e. in reversed sequential order relative to registering.

The store device 6 at the receiver terminal is built up in an analog way and has as a task to store the PCM-words line by line after recoding of the transmission signal in the recoding device 3 and to feed them out in maintained sequential order during odd lines, i.e. lines belonging to odd TV-fields, and in reversed sequential order during even lines, i.e. lines belonging to even TV-fields. For this purpose the store device 6 comprises two shift registers 61*a* and 61*b* which under subsequent line periods are fed alternately with the PCM-signal over a gate circuit 62*a* and 62*b* respectively in the form of AND-circuits, one input of which receives the PCM-signal from the recoding device 3 and another input of which receives the line timing signal from the output L' at the recoding device 3 directly and over an inverting gate 63 respectively. The line timing signal from the output L' is as at the transmission terminal assumed to have a binary 1-level during every second line period and otherwise to have a binary 0-level.

The read-out of the contents in the shift registers 61*a* and 61*b* takes place over gate circuits 64*a* and 64*b* in form of AND-circuits, one input of which is connected to the output of the respective shift register and another input of which receives the line timing signal from the output L' of the recoding device 3 over the inverting circuit 63 and directly respectively. The shift registers 61*a*, 61*b* are as at the transmission terminal provided with a control input S'' and S''' respectively through which the shifting in the shift register is controlled in such manner, that a control signal with binary 1-level provides right shift while a control signal with binary 0-level provides left shift. The control signal is generated by two OR-circuits 65*a* and 65*b* with two inputs P'' and R'' and P''' and R''' respectively. From the output L' a binary 1-signal is fed to the input R'' directly and to the input R''' over the inverting circuit 63 when registering occurs in the respective shift registers and from the output B' of the recoding device 3 a binary 1-signal is fed to the inputs P'' and P''' during odd TV-fields and a binary 0-signal is fed to the inputs P'' and P''' during even TV-fields. Thus, it is apparent that during odd TV-fields both registering and read-out take place in right shift direction while during even TV-fields registering takes place in right shift direction while read-out takes place in left shift direction, i.e. in reversed sequential order relative to registering so that the time sequence of the PCM-words in the original PCM-signal is re-established before the transmission to the PCM-decoder 4.

Figure 5:
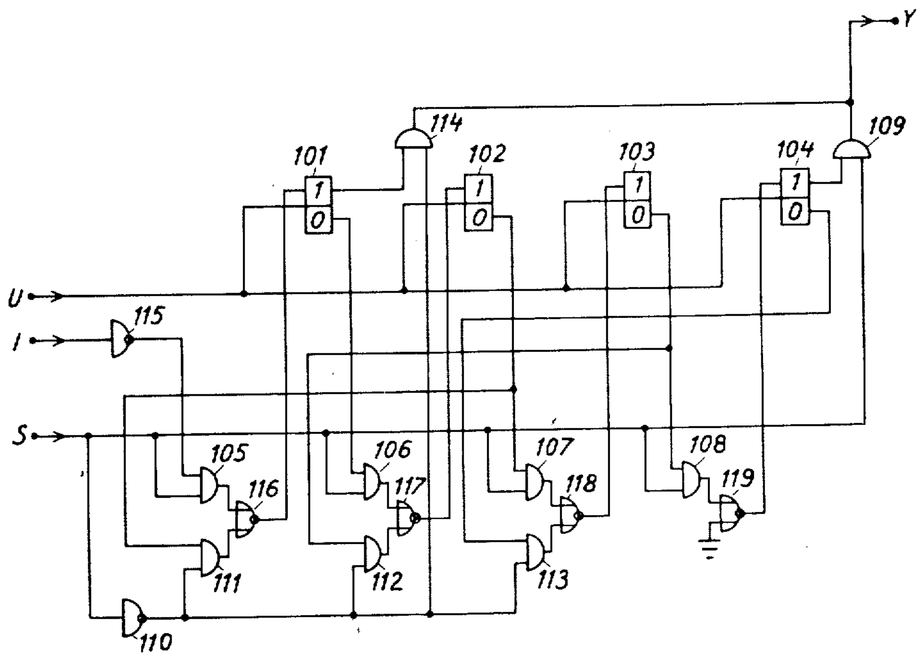
FIG. 5 shows a detail of the device in FIG. 4.

FIG. 5 shows a logic diagram of the essential structure of the shift registers 51*a*, 51*b*, 61*a* and 61*b* in FIG. 4. According to the example the shift registers are meant to store PCM-words during a line period, i.e. according to the earlier assumption 400 PCM-words with 4 bits or a storing capacity of 1,600 bits. However, for the sake of simplicity a shift register with a storing capacity of only 4 bits is shown, which bits are stored in flip-flops 101, 102, 103 and 104. The flip-flops are provided with clock inputs which are fed with bit timing pulses from a not shown source over a common input U to register the PCM-bits in the shift register in serial form over an input I and to read them out also in serial form over an output Y. The shifting of the PCM-bits in the shift registers takes place in right- or left hand direction in dependence on the binary level of a control signal which is supplied to a control input S corresponding to the control inputs S, S', S'' and S''' in FIG. 4 and which controls a gate circuit which will be described more in detail.

It is now assumed that the control input S receives a control signal with a binary 1-level which activates five AND-circuits 105, 106, 107, 108 and 109 and which over an inverting gate 110 blocks four AND-circuits 111, 112, 113 and 114. As it appears of the logic diagam the PCM-bit which is received over the input I will be supplied to the flip-flop 101 over an inverting circuit 115, AND-circuit 105 and a NOR-gate 116 under control of a bit timing pulse on the input U. The contents of the flip-flop 101 will under control of the same bit timing pulse be fed to the flip-flop 102 over the AND-circuit 106 and a NOR-gate 117 and in the same way the contents in the flip-flop 102 will be transmitted to the flip-flop 103 over the AND-circuit 107 and a NOR-gate 118 and the contents in the flip-flop 103 will be transmitted to the flip-flop 104 over the AND-circuit 108 and a NOR-gate 119 while the flip-flop 104 feeds out its contents to the output Y over the AND-circuit 109. It appears thus that during a control signal with binary 1-level on the control input S the contents of the shift register will shift in right hand direction.

If it instead is assumed that the control input S receives a control signal with a binary 0-level, the AND-circuits 105, 106, 107, 108 and 109 will be blocked and instead the inverting gate 110 will make AND-circuits 111, 112, 113 and 114 activated. Information can then not be registered in the shift register because the AND-circuit 105 is inhibited. Upon the appearance of a bit timing pulse on the output U the contents in the flip-flop 104 will be transmitted to the flip-flop 103 over the AND-circuit 113 and the NOR-circuit 118 and the contents in the flip-flop 103 will be transmitted to the flip-flop 102 over the AND-circuit 112 and the NOR-circuit 117. Furthermore, the contents in the flip-flop 102 is transmitted to the flip-flop 101 over the AND-circuit 111 and the NOR-circuit 116 and the contents in the flip-flop 101 is supplied to the output Y over the AND-circucit 114. Upon a control signal with a binary 0-level on the control input S the contents in the shift register is thus shifted in left hand direction. Observe that an alternative shift direction only exists during read-out. Registering is assumed to always take place in right hand shift direction and one of the inputs of the NOR-circuit 119 which should be connected to the signal source for providing registering in left hand shift direction is therefore earthed.

Figure 6:
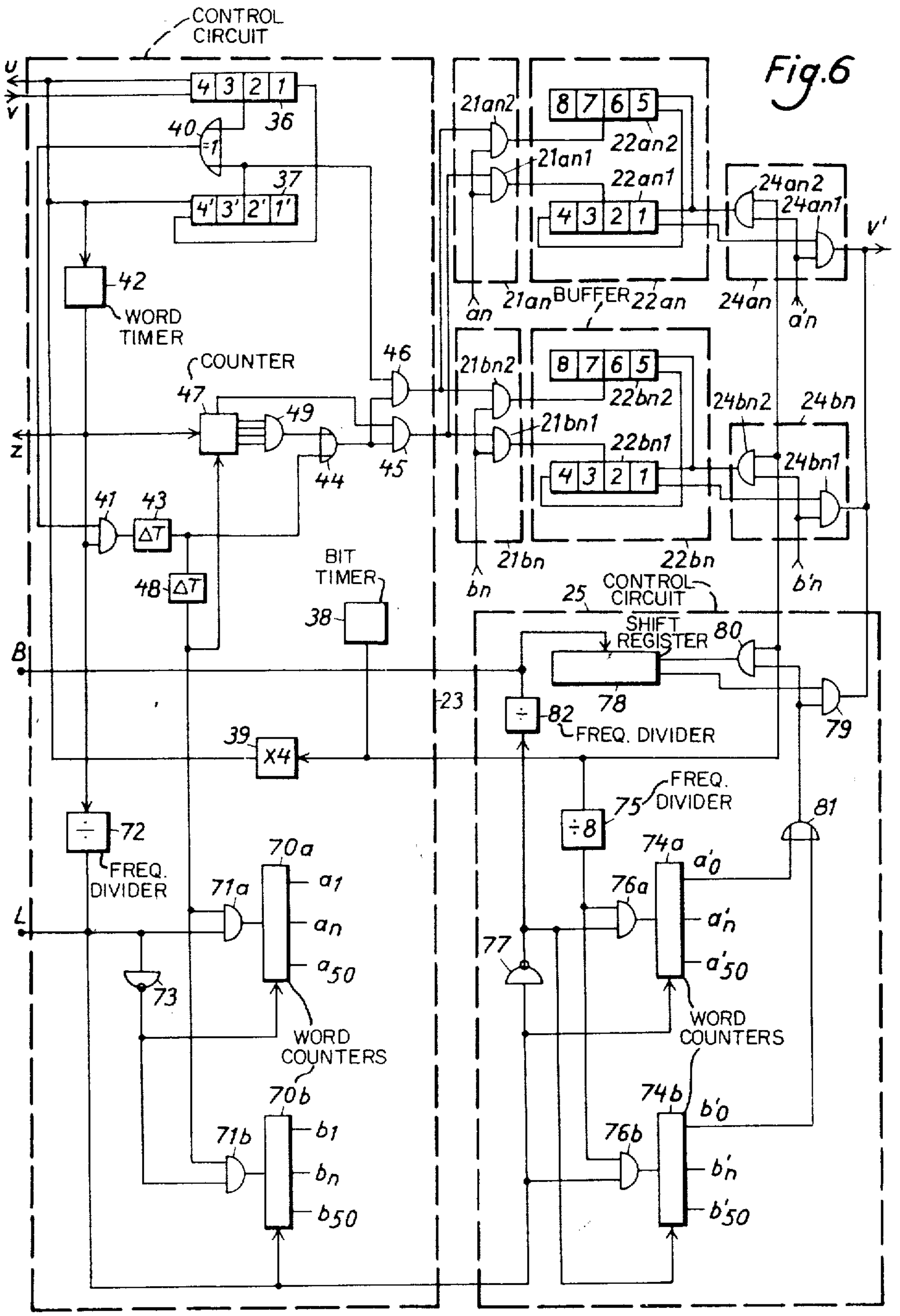
FIGS. 6 and 7 show block diagrams of a transmitter and a receiver respectively of the PCM-system in FIG. 2.

FIG. 6 shows a block diagram of the recoding device 2 of the transmitter terminal in the block diagram in FIG. 2 and 4. The PCM-words which are generated by the PCM-coder in FIG. 2 and 4 in correspondence to the picture elements in its received video signal are fed via an input *v* to a shift register 36 in the earlier mentioned control circuit 23. The shift register 36 comprises four bit positions and is cascade coupled with another identical shift register 37 in such manner that a PCM-word which is stored in the shift register 36 is transmitted in serial form to the shift register 37 upon registering a new PCM-word. The purpose with the shift registers 36 and 37 is to store two subsequent PCM-words to be able to investigate whether the signal information is repeated or not. During the appearance of repeated and thus redundant signal information the transmission of the signal information from the transmission terminal to the receiver terminal shall be blocked. Instead a binary number shall be transmitted which indicates the duration of the redundant signal information so that it shall be possible to reconstruct the latter at the receiver terminal.

In the control circuit 23 a bit timing pulse generator 38 is included, the frequency of which is multiplied with a factor 4 by a frequency multiplicator 39 to obtain bit timing pulses which are supplied to the PCM-coder 1 in FIG. 2 over an outlet u and controls the generation of the PCM-words on the outlet v and their registering in the shift registers 36 and 37. According to the example the video signal which is fed to the PCM-coder 1 is coded with 400 PCM-words per frame and line sweep, and it is assumed that maximally 50 PCM-words with non-redundant signal information occurs per frame and line sweep during normally occuring picture information. For storing of this non-redundant signal information and said binary numbers stating the duration of the redundant signal information, 50 shift register pair 22*an*1–22*an*2 and 22*bn*1–22*bn*2 respectively are arranged in each of the earlier mentioned buffers 22*a* and 22*b*, in which the registering takes place alternately under subsequent PCM-frames.

The PCM-words which are stored in the shift registers 36 and 37 are regarding their bit value mutually compared in the corresponding bit positions with help of the exclusive-OR-circuit 40. Upon a difference in the bit value and consequently a difference in the signal information the exclusive-OR-circuit 40 feeds an output signal to an input of an AND-circuit 41 which on another input during registering of a fourth and last bit in the PCM-word in the shift registers 36 and 37 is fed with a pulse train from a word timing pulse generator circuit 42 which consists of a counter circuit that is stepped by the bit timing pulses from the frequency multiplicator 39 and has two binary stages to which an AND-circuit is connected and which also supplies said pulse train to the PCM-coder 1 over an outlet z to control the generation of the PCM-words on the outlet v. The result of the difference in the signal information is now that the AND-circuit 41 supplies an output signal which over a delay circuit 43 and an OR-circuit 44 activates two AND-circuits 45 and 46 for transmission in parallel form on one hand of the counting result in a counting circuit 47 stepped forward by the output signal of the word timing pulse generator circuit 42 and on the other hand of the signal information in the shift register 37 to one of the shift register pair 22*an*1–22*an*2 and 22*bn*1–22*bn*2 over AND-circuit pair 21*an*1–21*an*2 and 21*bn*1–22*bn*2 respectively which alternately are activated under subsequent PCM-frames. The output signal of the AND-circuit 41 resets thereafter the counting circuit 47 over a delay circuit 48.

According to the example the counting circuit 47 consists of four binary stages and its counting result is read out in form of a binary number with four bits which states a number of PCM-words corresponding to the duration of the signal information read out from the shift register 37. When the counting circuit 47 has performed a counting cycle, i.e. counted to 16, the AND-circuit 49 which is connected to the four binary stages of the counting circuit 47 supplies an output signal which over the OR-circuit 44 activates the AND-circuits 45 and 46 for transmission of the counting result in the counting circuit 47 and of the signal information in the shift register 37 to one of the shift register pairs 22*an*l–22*an*2 and 22*bn*l–22*bn*2 respectively in the same way as when the AND-circuit 41 supplies an output signal.

The AND-circuit pair 21*an*l–21*an*2 and 21*bn*l–21*bn*2 are activated from an output an of a word counter 70*a* and from an output bn of a word counter 70*b* respectively. The word counters 70*a* and 70*b* have each 50 outputs which in sequential order are activated in such a way that the word counters 70*a* and 70*b* upon difference in the signal information of the PCM-words in the shift registers 36 and 37 which PCM-words are compared by the exclusive-OR-circuit 40 are stepped forward by the output signal of the AND-circuit 41 obtained over the delay circuits 43 and 48 and an AND-circuit 71*a* and 71*b* respectively. To make the word counters 70*a* and 70*b* to work and rest alternately under subsequent PCM-frames, the rest condition corresponding to that none of the 50 outputs is activated, a frequency divider 72 is arranged which is fed with said pulse train from the word timing generating circuit 42 and which generates a binary 1-signal on an output under every second PCM-frame and every second line sweep of the video signal. The output of the frequency divider 72 is connected on one hand directly to a control input of the AND-circuit 71a and a reset input of the word counter 70*b* and on the other hand over an inverting circuit 73 to a control input of the AND-circuit 71b and a reset input of the word counter 70*a*.

Read-out of the contents in the shift register pairs 22*an*l–22*an*2 and 22*bn*l–22*bn*2 takes place in serial form over the AND-circuits 24*an*l and 24*bn*l to an outlet *v'* under control of bit timing pulses which are supplied from the bit timing generator 38 over the AND-circuits 24*an*2 and 24*bn*2. The AND-circuits 24*an*l and 24*an*2 are activated from an output *a'n* of a word counter 74*a* while the AND-circuits 24*bn*l and 24*bn*2 are activated from an output *b'n* of a word counter 74*b*. The word counters 74*a* and 74*b* have each 51 outputs *a'*0–*a'*50 and *b'*O–*b'*50 respectively which is sequential order are activated in such a way that the word counters 74*a* and 74*b* are stepped forward over an AND-circuit 76*a* and 76*b* respectively by word timing pulses which are generated by a frequency divider 75 that is supplied with the bit timing pulses from the bit timing generator 38 and divides by eight. The output of the previously mentioned frequency divider 72 is connected on one hand to a control input of the AND-circuit 76*b* and a reset input of the word counter 74*a* and on the other hand over an inverting circuit 77 to a control input of the AND-circuit 76*a* and a reset input of the word counter 74*b*. By this it is achieved that the word counters 74*a* and 74*b* work and rest alternately under subsequent PCM-frames, the rest condition corresponding to that none of the 51 outputs is activated, and that the word counter 74a works when the word counter 70*a* rests while the word counter 74b works when the word counter 70*b* rests.

During activation of the output *a'*O of the word counter 74*a* or of the output *b'*O of the word counter 74*b* a synchronization word is read out from a shift register 78 over an AND-circuit 79 to the outlet *v'* under control of bit timing pulses which are obtained from the bit timing generator 38 over an AND-circuit 80. The AND-circuits 79 and 80 have for this purpose a respective control input connected over an OR-gate 81 to the output *a'*O of the word counter 74*a* and to the output *b'*O of the word counter 74*b* respectively.

As earlier mentioned the recoding device 2 at the transmission terminal is provided with two outlets L and B to transmit a line timing signal and a field timing signal respectively to the storing device 5 according to the invention. These signals are received from the output of the frequency divider 72 directly and over the inverting circuit 77 and a frequency divider 82 respectively which during odd TV-fields supplies a binary 1-signal and during even TV-fields supplies a heavy 0-signal. From the output of the frequency divider 82 information on if there is an odd or even TV-field is transmitted to the shift register 78, whereby during odd TV-field a binary one and during an even TV-field a binary zero digit is registered in the last bit position in the synchronization word for transmission to the receiver terminal.

Figure 7:
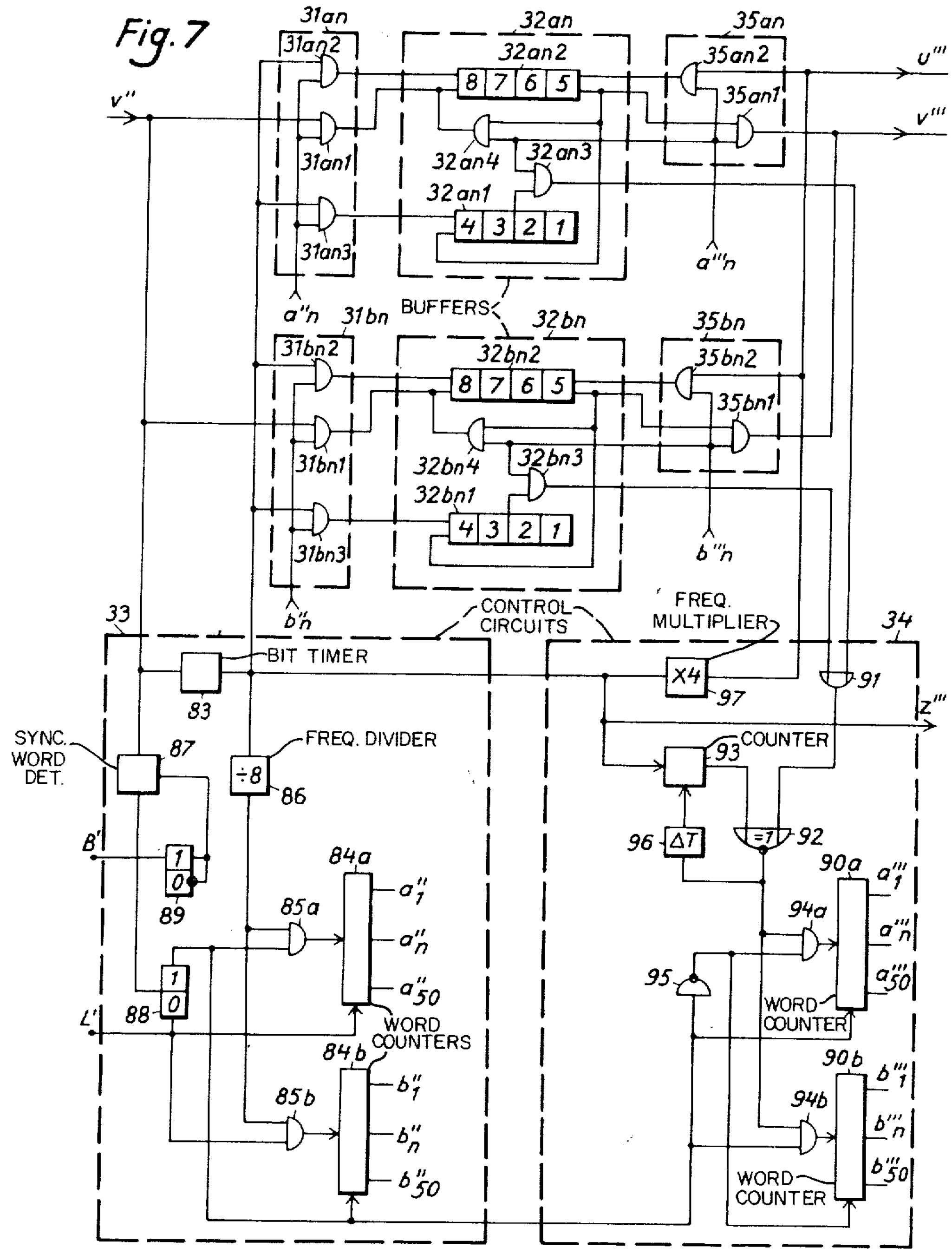

FIG. 7 shows a block diagram of the recoding device 3 at the receiver terminal in FIG. 2 and 4. The PCM-flow which is transmitted from the transmission terminal is fed via an outlet *v''* to a bit timing regenerator 83 in the control circuit 35 and under subsequent PCM-frames alternately to the buffers 32*a* and 32*b*. These comprise 50 shift register pair 32*an*1–32*an*2 and 32*bn*1–32*bn*2 respectively to which registering takes place over AND-circuits 31*an*1 and 31*bn*1 respectively under control of bit timing pulses which are generated by the bit timing regenerator 83 and supplied to the shift registers over AND-circuits 32*an*2, 31*an*3, 31*bn*2 and 31*bn*3 which are activated from an output $a''_n$ of a word counter 84*a* and from an output $b''_n$ of a word counter 84b respectively. The word counters 84*a* and 84*b* have each 50 outputs $a''_{1\text{-}50}$ and $b''_{1\text{-}50}$ respectively which in sequential order are activated in such a way that the word counters 84*a* and 84*b* are stepped forward over an AND-circuit 85*a* and 85*b* respectively by word timing pulses which are generated by frequency divider 86 that is supplied with the bit timing pulses from the bit timing regenerator 83 and divides by eight.

A synchronization word detector 87 is included in the control circuit 33 and is connected to the outlet $v''$ which word detector 87 upon detection of the transmitted synchronization word at the beginning of the PCM-frame reverses a flip-flop 88. The flip-flop 88 has two complementary outputs which are connected to a control input of the AND-circuit 85*a* and a reset input at the word counter 84*b* and to a control input of the AND-circuit 85*b* and a reset input of the word counter 84*a* respectively. In this way it is achieved that the word counters 84*a* and 84*b* work and rest alternately under subsequent PCM-frames, the rest condition corresponding to that none of the 50 outputs is activated.

As earlier mentioned the recoding device 3 at the receiver terminal is provided with two outlets L' and B' to transmit a line timing signal and a TV-field timing signal respectively to the storing device 6 according to the invention, which latter indicates whether odd or even TV-fields are being transmitted. The line timing signal is received from the output of the flip-flop 88 while the TV-field timing signal is received from an output of a second flip-flop 89 which is switched over to binary 1-position and 0-position respectively by the synchronization word detector 87 upon detection of a synchronization word with a binary one and with a binary zero respectively in the last bit position indicating transmission of odd TV-fields and of even TV-fields respectively.

In the 50 shift register pairs 32*an*1–32*an*2–and 32*bn*1–32*bn*2–the four bits signal information of the transmitted eight bits PCM-words are stored in the shift registers 32*an*2 and 32*bn*2 respectively while the 4-bits binary number which indicates the number of PCM-words during which signal information is maintained unchanged is stored in the shift registers 32*an*1 and 32*bn*1 respectively. The signal information is fed out on an outlet $v'''$ to the PCM-decoder 3 in FIG. 2 and 4 by activation of an AND-circuit 35*an*1 from an output $a'''_n$ of a word counter 90*a* and by activation of an AND-circuit 35*bn*1 from an output b''' of a word counter 90*b*, an AND-circuit 32*an*3 and 32*bn*3 respectively being activated at the same time for transmission of the said binary number over an OR-circuit 91 to one input of an exclusive-OR-circuit 92 another input of which is fed with the counting result of a counter 93 which is stepped forward by the bit timing pulses of the bit timing regenerator 83.

The exclusive-OR-circuit 92 supplies a binary one signal or alternatively a binary zero signal on an inverting output in dependence on whether the counting result of the counter 93 corresponds to the received binary number of the OR-circuit 91 or not. The binary one-signal steps forward the word counters 90*a* and 90*b* over the AND-circuits 94*a* and 94*b* respectively, 50 outputs $a'''_{1\text{-}50}$ and $b'''_{1\text{-}50}$ of the word counters 90*a* and 90*b* respectively being in sequential order activated.

One of the earlier mentioned two outputs of the flip-flop 88 is connected partly directly to a control input of the AND-circuit 94*b* and a reset input of the word counter 90*a* and partly over an inverting circuit 95 to a control input of the AND-circuit 94*a* and a reset input of the word counter 90*b* to make the word counters 90*a* and 90*b* to work and rest alternately under subsequent PCM-frames, the rest condition corresponding of that none of the 50 outputs is activated, and to achieve that the word counter 90*a* works when the word counter 84*a* rests while the word counter 90*b* works when the word counter 84*b* rests.

According to the example the bit timing frequency on the transmission medium is four times lower than the bit timing frequency of the PCM-coder 1 with four bits word format at the transmission terminal, whereby it appears that the bit timing regenerator 83 supplies its bit timing pulses at the same rate as the words are supplied from the PCM-coder 1. Thanks to this fact the word timing in the signal information supplied to the input $v'''$ of the PCM-decoder 3 can be controlled by supplying the latter over an input $z'''$ with the bit timing pulses from the bit timing regenerator 83.

The signal information which is stored in the shift registers 32*an*2 and 32*bn*2 shall be read out on the outlet $v'''$ that number of times that is stated by the binary number that is stored in the shift registers 32*an*1 and 32*bn*1 respectively, for which purpose the exclusive-OR-circuit 92 compares the counting result in the counter 93 with the stored binary number obtained over the OR-circuit 91 and upon equality generates a binary one signal which besides to step forward the word counters 90*a* and 90*b* respectively resets the counter 93 over a delay circuit 96. A condition is then that the signal information shall not become lost during read-out, which condition is fulfilled in such a way that the shift registers 32*an*2 and 32*bn*2 feed the signal information from the output back to the input through an AND-circuit 32*an*4 activated from the output $a'''_n$ of the word counter 90*b* 90*a* and through an And-circuit 32*bn*4 activated from the output $b'''_n$ of the word The bit timing frequency during read-out of the signal information on the outgoing cable $v'''$ is obtained by feeding the bit timing pulses from the bit timing regenerator 83 to a frequency multiplier 97 where the frequency is multiplied by four. From the frequency multiplier 97 the bit timing pulses are fed to the shift registers 32*an*2 and 32*bn*2 over an AND-circuit 35*an*2 activated from the output $a'''_n$ of the word counter 90*a* and over an AND-circuit 35*bn*2 actived from the output $b'''_n$ of the word counter 90*b* respectively. Bit timing pulses from the frequency multiplier 97 are also fed over an outlet $u'''$ to the PCM-decoder 3 for controlling the signal information supplied to the latter.

We claim:

1. Method for reducing the effect of a loss of information during transmission at compressed bandwidth, particularly during transmission at compressed bandwidth of a PCM-signal in which sequentially generated PCM-words indicate the light intensity of picture elements sequentially scanned in a TV-frame, the number of transmitted PCM-words in each TV-frame being less than the number of generated PCM-words, said method comprising the steps of sequentially generating during the scanning of a TV-picture first PCM-words representing the light intensity of the picture elements of the TV-picture, forming a first group of sequential first PCM-words representing one set of picture elements of a TV-picture, forming a second group of sequential first PCM-words representing another set of picture elements of the TV-picture, sequentially in a first order recoding the PCM-words of the first group to second PCM-words representing compressed information about the picture elements of the odd TV-fields; sequentially in an order opposite said first order recoding the PCM-words of the second group to second PCM-words representing compressed information about the picture elements of the even TV-fields, and sequentially transmitting the second PCM-words.

2. The method of claim 1 wherein said first and second groups of first PCM-words represent the odd and even lines, respectively, of a TV-frame.

3. The method of claim 1 wherein said first and second group of first PCM-words represent the odd and even picture fields in a TV-frame.

4. The method of claim 1 wherein the number of first PCM-words in the first and second groups are equal.

5. In a system for transmitting TV-pictures, apparatus for transmitting at compressed bandwidth a PCM-signal representing the light intensity of picture elements sequentially scanned in a TV-frame conprising: a coder means for sequentially coding analog light intensity signals to first PCM-words, each PCM-word representing the light intensity of a picture element; storage means for sequentially registering the first PCM-words representing a first set of the picture elements in a first group and for sequentially registering the first PCM-words representing a second set of picture elements in a second group, and for sequentially reading out the first PCM-words of said first group and said second group so that the words of one of the groups are read out in the same order as the first PCM-words are generated by said coder means and the words of the other group are read out in the opposite order; and recoder means receiving the read-out first PCM-words from said storage means for recoding said first PCM-words to second PCM-words representing compressed coded information about the picture elements.

6. The apparatus of claim 5 wherein said first and second groups are associated with odd and even lines respectively of a TV-frame.

7. The apparatus of claim 5 wherein said first and second groups are associated with odd and even fields, respectively, of a TV-frame.

8. The apparatus of claim 5 further comprising a derecoder means for sequentially decoding said second PCM-words to third PCM-words identical to said first PCM-words, another storage means for sequentially in the same order registering in a third group the third PCM-words identical to the first PCM-words of said first group and for sequentially in the same order registering in a fourth group the third PCM-words identical to the first PCM-words of said second group; and decoder means for sequentially in the same order decoding the third and fourth groups of PCM-words to form a signal representing the original light intensity of the picture elements.

9. The apparatus of claim 8 wherein the number of first PCM-words in the first and second groups are equal.

10. The apparatus of claim 8 wherein each of the storage means comprises a shift register for each group.

* * * * *